(12) United States Patent
Sugishita

(10) Patent No.: US 8,186,326 B2
(45) Date of Patent: May 29, 2012

(54) TWO-CYCLE ENGINE

(75) Inventor: Yuu Sugishita, Kawagoe (JP)

(73) Assignee: Husqvarna Zenoah Co., Ltd., Kawagoe-Shi (JP)

( * ) Notice: Subject to any disclaimer, the term of this patent is extended or adjusted under 35 U.S.C. 154(b) by 607 days.

(21) Appl. No.: 12/227,367

(22) PCT Filed: May 16, 2007

(86) PCT No.: PCT/JP2007/060007
§ 371 (c)(1),
(2), (4) Date: Nov. 14, 2008

(87) PCT Pub. No.: WO2007/132876
PCT Pub. Date: Nov. 22, 2007

(65) Prior Publication Data
US 2009/0235893 A1    Sep. 24, 2009

(30) Foreign Application Priority Data

May 17, 2006    (JP) ................................ 2006-137622

(51) Int. Cl.
*F02B 61/04* (2006.01)
(52) U.S. Cl. .................................................. 123/195 R
(58) Field of Classification Search .............. 123/195 R, 123/52.5, 65 R, 73 R
See application file for complete search history.

(56) References Cited

U.S. PATENT DOCUMENTS

| | | | | |
|---|---|---|---|---|
| 3,563,222 A | * | 2/1971 | Ishida ........................ | 123/192.1 |
| 4,114,586 A | * | 9/1978 | Fujikawa et al. ......... | 123/195 A |
| 4,434,756 A | * | 3/1984 | Nilsson et al. ............ | 123/195 R |
| 4,969,422 A | * | 11/1990 | Ishikawa et al. ........... | 123/41.86 |
| 4,974,973 A | | 12/1990 | Janeke | |
| 6,086,260 A | * | 7/2000 | Dahlberg ....................... | 384/457 |
| 6,205,962 B1 | * | 3/2001 | Berry, Jr. ..................... | 123/73 A |
| 6,390,683 B1 | | 5/2002 | Hirose et al. | |
| 6,666,183 B2 | * | 12/2003 | Abe et al. .................. | 123/195 R |
| 6,725,958 B2 | * | 4/2004 | Ashida et al. ................. | 180/186 |

(Continued)

FOREIGN PATENT DOCUMENTS

JP        63-124863 A    5/1988

(Continued)

OTHER PUBLICATIONS

International Preliminary Report on Patentability and Written Opinion of the International Searching Authority dated Dec. 10, 2008 (5 pages), issued in counterpart International Application Serial No. PCT/JP2007/060007.

(Continued)

*Primary Examiner* — Noah Kamen
*Assistant Examiner* — Long T Tran
(74) *Attorney, Agent, or Firm* — Holtz, Holtz, Goodman & Chick, PC

(57) ABSTRACT

A two-cycle engine includes a crankshaft that has shafts on both sides and a crankcase that pivotally supports the shafts of the crankshaft through bearings. A collar is circumferentially provided on an outer ring of one of the bearings that supports one of the shafts on a side at which a low load is applied. The crankcase is provided with an inserting portion into which the one of the bearings is inserted. The inserting portion penetrates the crankcase while keeping a constant diameter. An engaging portion with which the collar is engaged from an inner side is provided in an inner portion of the inserting portion.

2 Claims, 2 Drawing Sheets

U.S. PATENT DOCUMENTS

2003/0217724 A1 * 11/2003 Hattori et al. ............. 123/195 A

FOREIGN PATENT DOCUMENTS

| | | | |
|---|---|---|---|
| JP | 5-86034 | U | 11/1993 |
| JP | 7-189704 | A | 7/1995 |
| JP | 2645168 | B2 | 5/1997 |
| JP | 2001-051534 | A | 2/2001 |
| JP | 2001-99173 | A | 4/2001 |
| JP | 2003-021154 | A | 1/2003 |
| JP | 2004-270774 | A | 9/2004 |
| JP | 2004270774 | A * | 9/2004 |

OTHER PUBLICATIONS

Japanese Office Action dated Jul. 12, 2011 (and English translation thereof) in counterpart Japanese Application No. 2006-137622.

* cited by examiner

TWO-CYCLE ENGINE

This application is a U.S. National Phase Application under 35 USC 371 of International Application PCT/JP2007/060007 filed May 16, 2007.

TECHNICAL FIELD

The present invention relates to a two-cycle engine, and more particularly to a small two-cycle engine mounted on a portable work machine such as a chain saw, a cutoff saw, a brushcutter, or a blower.

BACKGROUND ART

A conventional two-cycle engine mounted on portable work machine sometimes has an arrangement in which a crankcase is divided into halves. According to such a halved structure, when a crankshaft is supported on both sides of the crankcase with a crank portion interposed therebetween, the crankcase is divided into two half bodies, specifically, one half body for supporting one end of the crankcase and the other half body for supporting the other end of the crankcase (for example, see Patent Documents 1 and 2).

In such a halved structure, the one half body is provided with a step that externally holds a shoulder of an outer ring of a bearing to prevent the bearing that supports the crankshaft from dropping to the outside. At the same time, a shoulder of an inner ring of the bearing is internally held by a step of the crankshaft to prevent the bearing from moving inwardly.

On the other hand, unlike the one half body, the other half body is not provided with a step due to manufacturing restrictions. A shoulder of an outer ring of the other bearing is held by an externally-disposed holder such as an E-ring. An inner ring of the other bearing is held in the same manner as in the one half body.

The step of the half body holds the shoulder of the outer ring of the bearing more securely than the E-ring or the like. Therefore, for example, a saw chain such as a chain saw is driven around a portion of the crankshaft adjacent to the one half body, which means that the portion of the crankshaft adjacent to the one half body is subjected to a greater load than a portion of the crankshaft adjacent to the other half body.

Patent Document 1: JP-A-63-124863 (see FIG. 1)
Patent Document 2: JP-A-07-189704 (see FIG. 2)

DISCLOSURE OF THE INVENTION

Problems to Be Solved by the Invention

However, when the other bearing that supports the portion of the crankshaft subjected to a lower load is held by the holder such as the E-ring, a width of the crankcase (a width in an axial direction of the crankshaft) is increased by a size of the holder. Thus, the miniaturization of the engine is hampered.

An object of the invention is to provide a two-cycle engine capable of favorably holding a bearing and reliably reducing a width of a crankcase.

Means for Solving the Problems

A two-cycle engine according to an aspect of the invention includes a crankshaft having shafts on both ends thereof and a crankcase that pivotally supports the shafts of the crankshaft through bearings, in which a collar is circumferentially provided on an outer ring of at least one of bearings that receives one of the shafts, the crankcase is provided with an inserting portion into which the one of the bearings is inserted, the inserting portion penetrating the crankcase while keeping a constant diameter, and an engaging portion with which the collar is engaged from an inner side is provided in an inner portion of the inserting portion.

According to the aspect of the invention, the one of the bearings can be favorably axially positioned by engaging the collar provided on the outer ring of the one of the bearings with the engaging portion of the crankcase. Further, a width of the crankcase can be reduced because a conventional holder such as an E-ring is not used. Therefore, the engine can be downsized.

The collar may be provided at a position in an axially inner portion of the outer ring.

Since the collar is provided at the position in the axially inner portion of the outer ring, a contact area of an outer circumference of the outer ring and an inner circumference of the inserting portion can be enlarged. Therefore, the bearing can be more securely held.

An exemplary embodiment of the invention will be described below with reference to the drawings.

Figure 1:
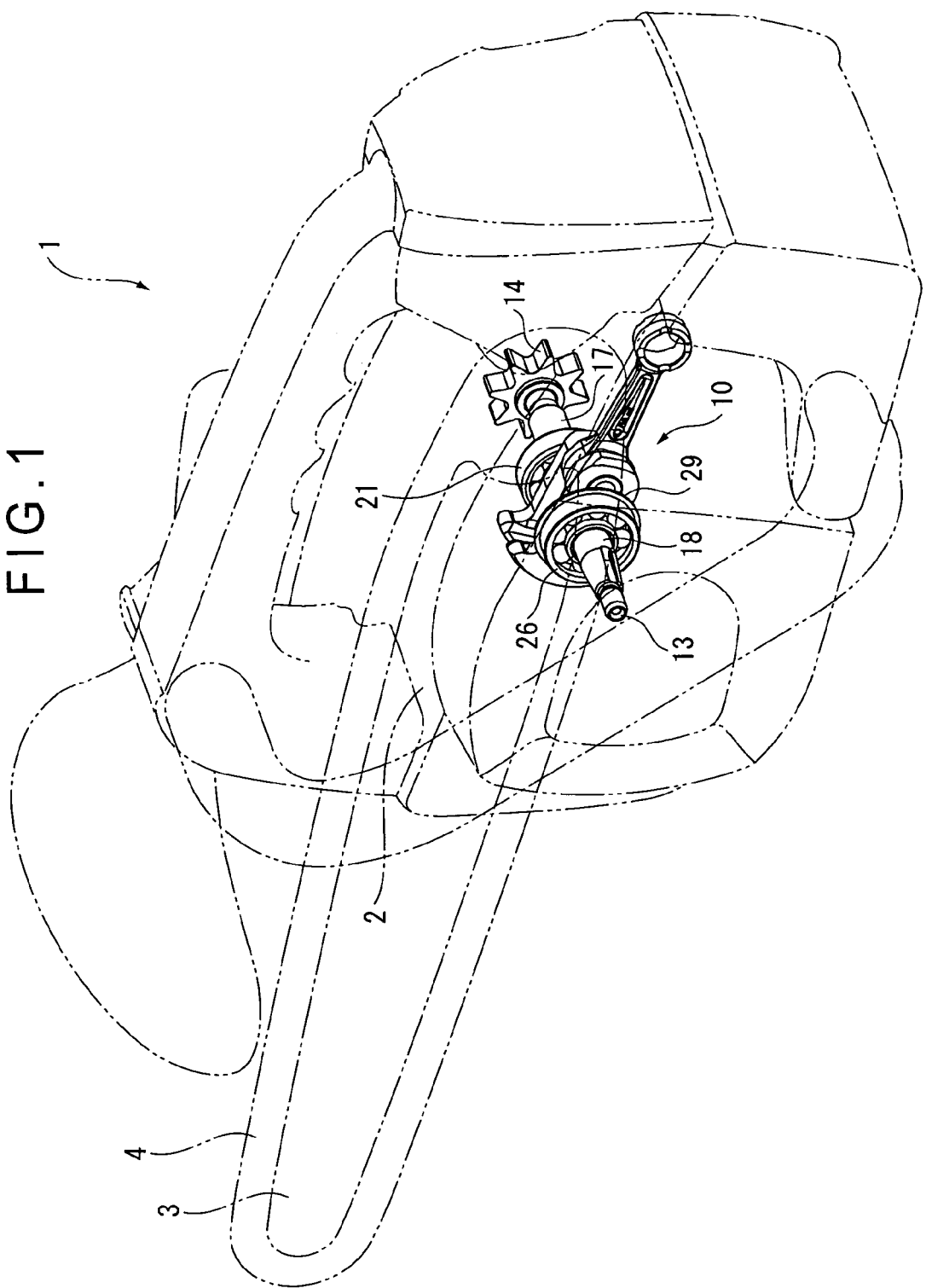
FIG. 1 is a perspective view illustrating a primary portion of a two-cycle engine and an appearance of a chain saw (a phantom line) on which the engine is mounted according to an exemplary embodiment.
Figure 2:
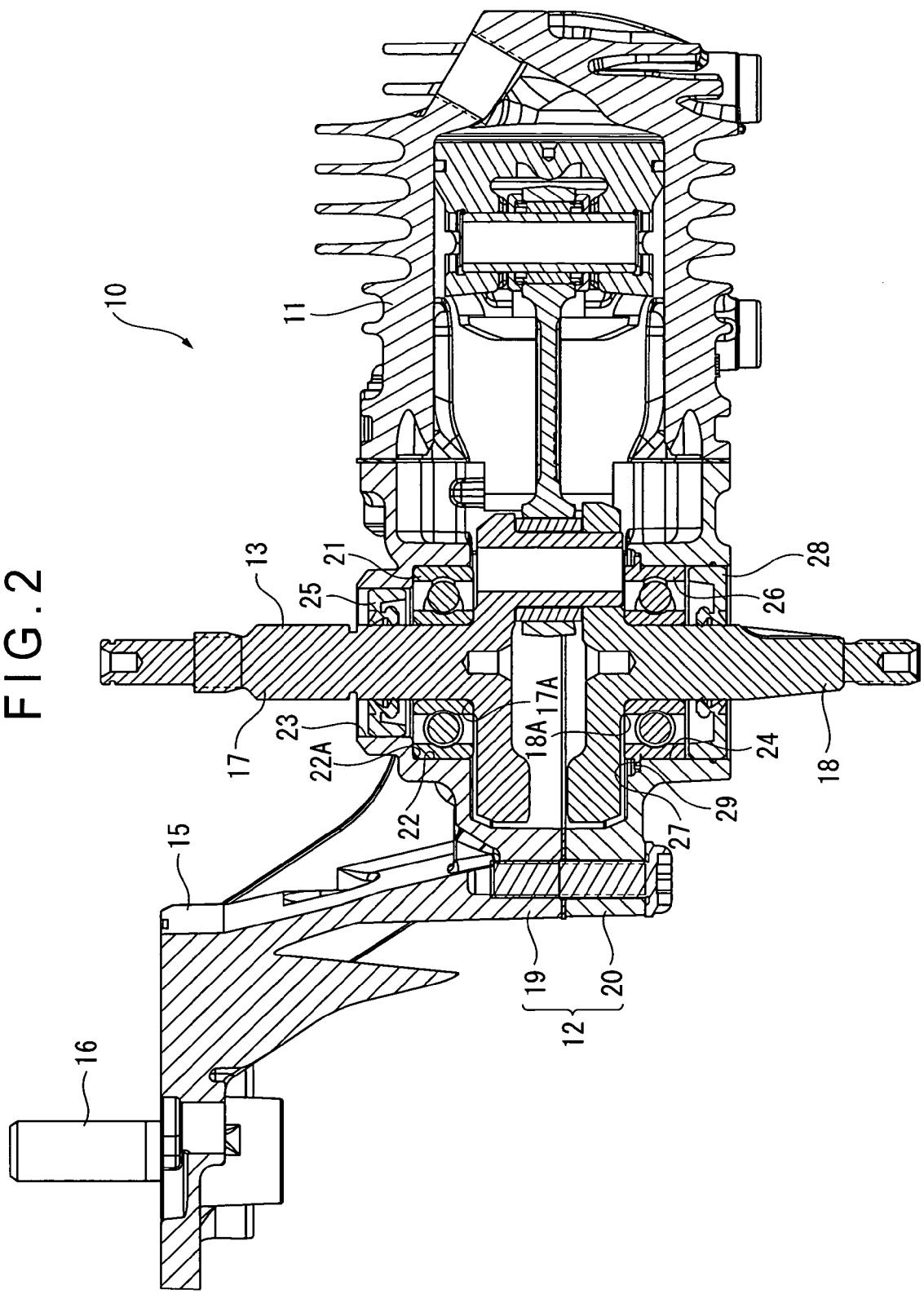
FIG. 2 is a cross sectional view illustrating the engine according to the exemplary embodiment.

FIG. 1 is a perspective view illustrating a primary portion of a two-cycle engine 10 (hereinafter simply referred to as an engine 10) and an appearance of a chain saw 1 (a phantom line) on which the engine 10 is mounted according to the exemplary embodiment. FIG. 2 is a cross sectional view of the engine 10.

As shown in FIGS. 1 and 2, the chain saw 1 includes a body 2 in which the engine 10 is accommodated. The engine 10 is accommodated to be laid down such that a cylinder 11 is disposed in a rear portion of the body 2 and a crankcase 12 is disposed in a front portion of the body 2.

A sprocket 14 is pivoted on an end of a crankshaft 13 protruding from the crankcase 12. A saw chain 4 is wound around the sprocket 14 and an outer circumference of a guide bar 3, and is driven by the engine 10. The guide bar 3 is fixed to a guide bar attachment 15 integrated with the crankcase 12 by a guide pin 16 and a suitable fastener (not shown).

In terms of the crankshaft 13 in FIG. 2, the sprocket 14 (FIG. 1) is pivoted on a distal end of a shaft 17 shown in an upper side in FIG. 2, which is referred to as a high-loaded side. On the other hand, a cooling fan (not shown) for cooling the engine 10 is attached to a distal end of a shaft 18 shown in a lower side in FIG. 2, which is referred to as a low-loaded side according to the exemplary embodiment.

The crankcase 12 includes a first half body 19 that supports the high-loaded side of the crankshaft 13 and a second half body 20 that supports the low-loaded side of the crankshaft 13. The above-described guide bar attachment 15 extends from an end of the first half body 19.

The first half body 19 is provided with a bearing 21 that receives the shaft 17 of the crankshaft 13. The bearing 21 is inserted into an inserting portion 22 provided on the first half body 19 by machining. When the bearing 21 is disposed thereon, a shoulder of an outer ring of the bearing 21 is held by a step 22A while a shoulder of an inner ring of the bearing 21 is held by a step 17A adjacent to a base end of the shaft 17. With such an arrangement, the bearing 21 is axially positioned.

The first half body 19 includes a discrete inserting portion 23 provided externally to the inserting portion 22 by machining. A ring-shaped bearing seal 25 is inserted into the inserting portion 23 having a smaller diameter than the inserting portion 22. An inner circumference of the bearing seal 25 is in contact with the shaft 17 to prevent leakage of air-fuel mixture or oil content working as a lubricant in the air-fuel mixture from the crankcase 12.

On the other hand, the second half body 20, into which the shaft 18 of the crankshaft 13 is inserted, is provided with an inserting portion 24 by machining. The inserting portion 24 penetrates the second half body 20. An inner diameter of the inserting portion 24 is entirely constant and is the same as an inner diameter of the inserting portion 22 of the first half body 19. An engaging portion 27 having a larger diameter than the inserting portion 24 is sequentially and circumferentially provided at an inner side of the inserting portion 24. The engaging portion 27 is machined to have a small width.

A bearing 26 is provided at an inner side of the inserting portion 24 of the second half body 20 while a bearing seal 28 contacting the shaft 18 is provided adjacent to the bearing 26 at an outer side of the inserting portion 24. The bearing seal 28 has the same function as the above-described bearing seal 25.

At the low-loaded side, a collar 29 is provided sequentially and circumferentially on an outer ring of the bearing 26, the collar 29 protruding radially and outwardly from an inner portion of an outer circumference thereof. The collar 29 is engaged with the engaging portion 27 from the inside. Accordingly, the bearing 26 is axially positioned by engaging the collar 29 on the outer ring with the engaging portion 27 and is held by the collar 29 so that the bearing 26 is prevented from dropping to the outside. An inner ring of the bearing 26 is held by a step 18A of the shaft 18 in the same manner as the inner ring of the bearing 21.

At this time, a large moment is not generated on the shaft 18 supported by the bearing 26 because the shaft 18 is located on the low-loaded side. Accordingly, a thrust load is scarcely applied on the bearing 26 that supports the shaft 18. Thus, the bearing 26 is reliably axially positioned only by the thin collar 29 and by fitting the outer circumference of the outer ring of the bearing 26 with an inner circumference of the inserting portion 24. Also, by providing the collar 29 close to an axially inner side of the outer ring, a contact area of the fitting portion can be enlarged. Therefore, the bearing 26 can be more securely held. Further, a width of the inserting portion 24 can be reduced because a conventional holder such as an E-ring is not used, which contributes to the miniaturization of the engine.

The best arrangements, methods, and the like for carrying out the invention have been heretofore disclosed, but the scope of the invention is not limited thereto. Although the invention is illustrated and described mainly with reference to a specified embodiment, those skilled in the art may variously modify the embodiment in shapes, amounts, and other detail arrangements without departing from the spirit and an object of the invention.

The above disclosure limiting the shapes, amounts, and the like are merely exemplary statements for facilitation of the understanding of the invention and do not limit the scope of the invention. Statements of members without part of or all of the limitations on the shapes, amounts, and the like are within the scope of the invention.

For example, although the collar 29 provided on the outer ring of the bearing 26 on the low-loaded side is positioned adjacent to the axially inner side of the outer ring to increase the contact area at which the outer surface of the outer ring contacts the inner surface of the inserting portion 24 according to the exemplary embodiment, the collar 29 may be provided at a central portion of the outer ring as long as the contact area can be sufficiently large. The collar 29 may also be provided in the same plane as an inner end surface of the outer ring to maximize the contact area.

The invention claimed is:

1. A two-cycle engine, comprising:
    a crankshaft having shafts on both ends thereof, and a crankcase that pivotally supports the shafts of the crankshaft through bearings,
    wherein:
        a collar projects radially outward from an outer circumferential surface of an outer ring of at least one of the bearings,
        an inserting portion having a constant inner diameter penetrates the crankcase,
        an engaging portion having an inner diameter that is larger than the inner diameter of the inserting portion is provided at a side of the inserting portion that is at an interior of the crankcase, and
        the at least one of the bearings is inserted in the inserting portion such that (i) the outer circumferential surface of the outer ring is in direct contact with an inner circumferential surface of the inserting portion, and (ii) the collar provided on the at least one of the bearings contacts the engaging portion from an inner side of the crankcase.

2. The two-cycle engine according to claim 1, wherein the collar is provided at an axially inner portion of the outer circumferential surface of the outer ring.

* * * * *